(12) United States Patent
Moser et al.

(10) Patent No.: US 10,967,452 B2
(45) Date of Patent: Apr. 6, 2021

(54) DEVICE FOR MEASURING THE DEPTH OF A WELD SEAM IN REAL TIME

(71) Applicant: PRECITEC GMBH & CO. KG, Gaggenau-Bad Rotenfels (DE)

(72) Inventors: Rudiger Moser, Malsch (DE); Thibault Bautze, Karlsruhe (DE); Martin Schonleber, Aschaffenburg (DE)

(73) Assignee: PRECITEC GMBH & CO.KG, Rotenfels (DE)

( * ) Notice: Subject to any disclaimer, the term of this patent is extended or adjusted under 35 U.S.C. 154(b) by 188 days.

(21) Appl. No.: 15/520,719

(22) PCT Filed: Oct. 16, 2015

(86) PCT No.: PCT/EP2015/074024
§ 371 (c)(1),
(2) Date: Apr. 20, 2017

(87) PCT Pub. No.: WO2016/062636
PCT Pub. Date: Apr. 28, 2016

(65) Prior Publication Data
US 2017/0326669 A1 Nov. 16, 2017

(30) Foreign Application Priority Data
Oct. 20, 2014 (DE) .......... 10 2014 115 278

(51) Int. Cl.
*B23K 9/095* (2006.01)
*B23K 26/03* (2006.01)
(Continued)

(52) U.S. Cl.
CPC ........ *B23K 9/0956* (2013.01); *B23K 15/0013* (2013.01); *B23K 15/02* (2013.01);
(Continued)

(58) Field of Classification Search
CPC ......... G01N 21/84; B23K 26/20; B23K 26/03
(Continued)

(56) References Cited

U.S. PATENT DOCUMENTS 3,277,392 A * 10/1966 Nicolai .................. H01S 3/083
359/238
6,936,152 B2 * 8/2005 Kojima ............ G01N 27/44704
204/601
(Continued)

FOREIGN PATENT DOCUMENTS

CN 101646525 A 2/2010
CN 102773607 A 11/2012
(Continued)

OTHER PUBLICATIONS

Thorlabs "FiberPort Collimators/Couplers," retrieved on May 9, 2014 from http://www.thorlabs.de/newgrouppage9.cfm?objectgroup_id=2940.

*Primary Examiner* — Tu B Hoang
*Assistant Examiner* — Thomas J Ward
(74) *Attorney, Agent, or Firm* — Muncy, Geissler, Olds & Lowe, P.C.

(57) ABSTRACT

A device for measuring the depth of a weld seam in real time during the welding or joining of a workpiece by means of radiation, including: its measuring light source, the light of which is coupled by a beam splitter into a reference arm and a measuring arm; a collimator module having at least one collimation lens for collimating a measuring light beam, which is fed to the collimator module via an optical waveguide in the measuring arm, and for imaging the measuring light beam, which is reflected from a workpiece to be processed, on an exit/entry surface of the optical waveguide; a coupling element for coupling the measuring light beam into the beam path of a processing beam; a focusing lens for the joint focusing of the measuring light beam and the (Continued)

processing beam on the workpiece and for the collimating of the reflected measuring light beam; and an analysis unit for determining the depth of a weld seam, into which the measuring light reflected from the workpiece is guided with the superimposed, reflected light from the reference arm. The collimator module includes a device for setting the axial focal position of the measuring light beam, and for setting the lateral focal position of the measuring light beam, and a field lens, which is arranged between the exit/entry surface of the optical waveguide and the collimation lens and defines the beam widening of the measuring light beam and therefore the focus diameter of the measuring light beam.

11 Claims, 4 Drawing Sheets

(51) Int. Cl.
| | | |
|---|---|---|
| *G01B 11/22* | (2006.01) | |
| *G01B 5/00* | (2006.01) | |
| *B23K 26/21* | (2014.01) | |
| *B23K 15/00* | (2006.01) | |
| *B23K 15/02* | (2006.01) | |
| *B28B 17/00* | (2006.01) | |
| *G01B 9/02* | (2006.01) | |

(52) U.S. Cl.
CPC ............ *B23K 26/032* (2013.01); *B23K 26/21* (2015.10); *B28B 17/0081* (2013.01); *G01B 5/0037* (2013.01); *G01B 9/0203* (2013.01); *G01B 11/22* (2013.01)

(58) Field of Classification Search
USPC ............ 219/121.11, 121.13, 121.14, 130.01, 219/130.21
See application file for complete search history.

(56) References Cited

U.S. PATENT DOCUMENTS

| | | | |
|---|---|---|---|
| 8,822,875 B2 * | 9/2014 | Webster | ................ A61B 18/20 219/121.11 |
| 9,757,817 B2 * | 9/2017 | Webster | ............... B23K 26/032 |
| 2002/0013574 A1 * | 1/2002 | Elbrecht | ............. A61F 9/00825 606/5 |
| 2012/0285936 A1 | 11/2012 | Urashima et al. | |

FOREIGN PATENT DOCUMENTS

| | | |
|---|---|---|
| DE | 101 51 828 A1 | 5/2003 |
| DE | 101 55 203 A1 | 6/2003 |
| DE | 10 2007 016 444 A1 | 10/2008 |
| DE | 10 2009 046 485 | 5/2011 |
| DE | 10 2011 078 089 A1 | 12/2012 |
| WO | WO 2004/045798 A1 | 6/2004 |
| WO | WO 2014/138939 A1 | 9/2014 |

* cited by examiner

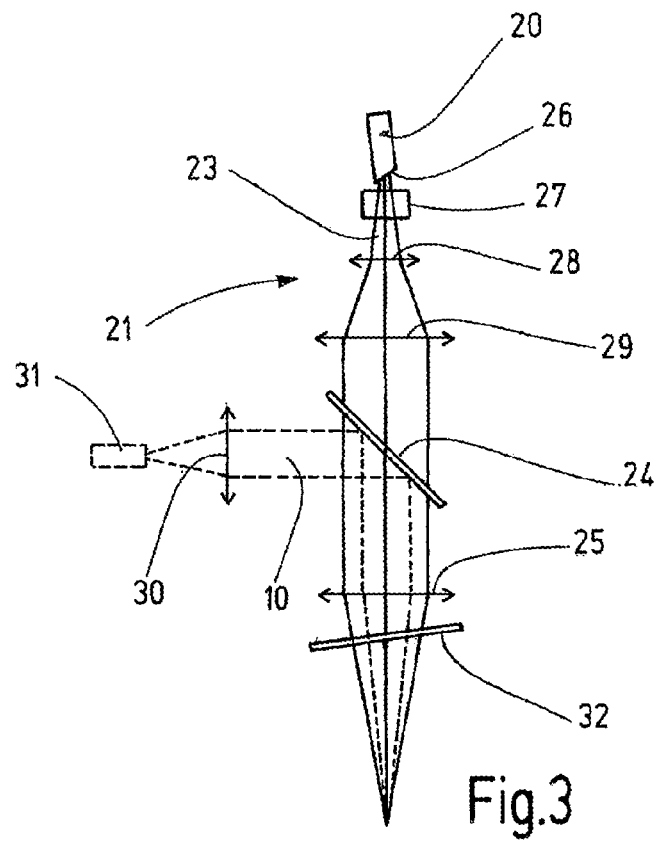
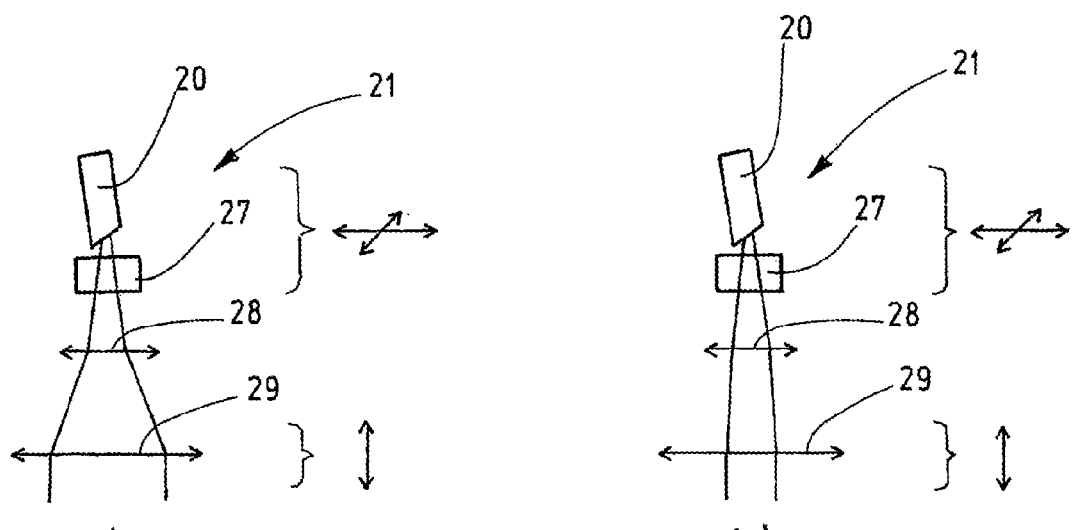
Fig.3
Fig.4

DEVICE FOR MEASURING THE DEPTH OF A WELD SEAM IN REAL TIME

BACKGROUND OF THE INVENTION

Field of the Invention

The present invention relates to a device for measuring the depth of a weld seam in real time during the welding or joining of a workpiece by means of radiation.

As shown in FIG. 1, a vapor capillary 11, which is also called the keyhole and is surrounded by liquid melt 12, arises in the laser deep welding process during a welding procedure along the beam axis of the processing laser beam 10. The depth Td of the vapor capillary, also referred to as the keyhole depth hereafter, is related to the weld seam or welding penetration depth Te. The solidified melt 14 is located behind the liquid metal 12 viewed in the feed direction V.

If the depth Td of the keyhole 11 is known, the welding penetration depth Te can thus be defined with the aid of metallographic examinations and a correction factor can be ascertained between the two variables. By measuring the keyhole depth Td and applying the correction factor, it is thus possible to measure the welding penetration depth Te in real time. In many materials, keyhole depth Td and welding penetration depth Te are nearly identical, so that correction factors can be omitted. Knowing the welding penetration depth Te is of great significance in numerous applications.

In the laser welding of metals, there is presently no commercial system for directly determining the depth of the weld seam during the welding process. It is therefore not known after the welding process how deep the welding penetration into the material was. The welding penetration depth is an important parameter, however, because a depth which is too low can result in a lack of strength. In contrast thereto, a depth which is excessively large can cause welding through, whereby the weld seam is visible on the rear side.

A micrograph is frequently produced to be able to determine the welding penetration depth later. This method represents a destructive testing method, which is costly and time-consuming, which is why checking is typically only carried out as a random sample. By way of the determination of the welding penetration depth in real time, variations of the welding penetration depth can be ascertained and corrected by adapting the parameters. In this way, a continuous process check is provided, on the one hand, and discarding of unusable material is reduced, on the other hand.

BRIEF DISCUSSION OF THE RELATED ART

A laser processing device is known from DE 101 55 203 A1, having an optical measuring system for acquiring surface data, in which measuring light is coupled from a short-coherence light source by means of a beam splitter into the processing beam path, so that the focusing of measuring light and processing laser light is performed by a common lens. The reflected measuring light and a reference wave are input into a measuring system, which is constructed like an interferometer.

For an analysis of the processing result and/or a regulation of the processing process during a manufacturing procedure, the measurement point is selected in a processing cell before, at, and/or behind the processing point. For example, the focal position, the workpiece position, the workpiece surface, and, for example, a gap between joining partners can be monitored and regulated by way of the measuring point before the processing point. By way of a measurement at the processing point, for example, the processing depth can also be monitored and regulated.

DE 10 2007 016 444 A1 describes a further processing device for processing a workpiece by means of a high-energy processing beam, to which a coherence tomograph is assigned for surface scanning for distance measurement. A measuring light beam is coupled into a processing beam path and focused jointly with the processing beam on the workpiece, so that the focus of both beams is located in the same plane. Surface structures on the workpiece are thus acquired to monitor the processing process.

In a known device for laser beam soldering (DE 101 51 828 A1), in particular laser beam brazing, it is provided that a focusing lens is linearly displaceable perpendicularly to the optical axis of the collimation lens for positioning the laser focus in relation to the soldering wire. To implement the relative movement of the optical axes of collimation lens and focusing lens, the laser beam feed, i.e., the fiber end of an optical waveguide and the collimation lens can also be displaced jointly.

DE 10 2011 078 089 A1 describes a method and an arrangement for distance measurement in a laser processing facility, in which the reflection of the processing beam on the workpiece is used as the measuring beam. The measuring beam is superimposed with a reference beam, which is decoupled by a beam splitter from the processing beam, according to the principle of a short-coherence interferometer.

WO 2004/045798 A1 describes a device and a method for displacing and setting the focal point of a processing laser beam, in which the adjustment of the focus is enabled by displacement of the focusing lens.

DE 10 2009 046 485 A1 describes a further method and a device for laser welding. The axial focal position of the processing laser beam is adjusted here by axial displacement of the collimation lens and/or the focusing lens.

The company Thorlabs offers, under item number: PAFA-X-4-C, a fiber collimator having five degrees of freedom for adjustment in the x, y, z, q, and j directions. In this case, a translation of the collimation lens, a tilt of the fiber holder, and a distance change between fiber end and collimation lens are provided.

A system for determining the welding penetration depth during laser welding in real time is known from U.S. Pat. No. 8,822,875 B2, in which a measuring light beam is collimated and focused in the keyhole. The reflected measuring light is fed to an analysis system, which comprises a broadband light source, an interferometer, and a spectrometer. The coupling of the measuring light into the processing beam path is not described, however.

Presently, there is still no commercial system for directly measuring the keyhole depth or the welding penetration depth. Therefore, there is also not yet a system for coupling measuring light optimally into the keyhole. Commercially available fiber collimators are not designed to collimate measuring light in an adjustable manner (setting of the x, y, and z directions and the beam widening), so that the beam can be focused through a welding head optimally into a keyhole and the reflection is imaged back in the laser. In most cases, dust protection is also not provided, so that the collimator and the optical units contained therein withstand the conditions during the laser welding.

To obtain items of information about the keyhole during laser deep welding, a camera-based coaxial observation of the keyhole opening has heretofore been used, using which, however, only a planar observation of the keyhole and its surroundings can be ascertained, but not an actual keyhole depth. For this purpose, only the focal position of the measuring light has to be adjusted. Furthermore, a coaxial polarization-dependent observation of the keyhole emission enables inferences about keyhole geometry, but does not supply actual depth information.

So-called optical coherence tomography (OCT) suggests itself here as the measuring method, as is already used in ophthalmology.

SUMMARY OF THE INVENTION

The object of the present invention is to provide a device for measuring a welding penetration depth in real time during welding or joining, using which in particular the depth of a vapor capillary occurring in this case can be measured reliably, to ascertain the welding penetration depth therefrom.

This object is achieved by the device as claimed in claim 1. Advantageous refinements and embodiments of the invention are described in the dependent claims.

According to the invention, a device for measuring the depth of a weld seam in real time during the welding or joining of a workpiece by means of radiation comprises a measuring light source, the light of which is coupled by a beam splitter into a reference arm and a measuring arm; a collimator module having at least one collimation lens for collimating a measuring light beam, which is fed to the collimator module via an optical waveguide in the measuring arm, and for imaging the measuring light beam reflected back from a workpiece to be processed on an exit/entry surface of the optical waveguide (20); a coupling element for coupling the measuring light beam into the beam path of a processing beam; a focusing lens for jointly focusing the measuring light beam and the processing beam on the workpiece and for collimating the reflected measuring light beam; and an analysis unit for determining the depth of a weld seam, into which the measuring light reflected back from the workpiece is guided with the superimposed reflected light from the reference arm. The collimator module furthermore comprises in this case means for setting the axial focal position of the measuring light beam, means for setting the lateral focal position of the measuring light beam, and a field lens (28), which is arranged between the exit/entry surface of the optical waveguide and the collimation lens and defines the beam widening of the measuring light beam and therefore the focus diameter of the measuring light beam.

As a result of the collimator module provided according to the invention, it is possible to superimpose the measuring light transported via an optical waveguide coaxially with a processing laser, focus it into the keyhole, and subsequently couple the light reflected from the keyhole bottom back into the optical waveguide. The distance between keyhole bottom and processing head can therefore be determined and the keyhole depth can be measured if the distance to the material surface is known. In particular, it is possible by way of the various setting options on the collimator module to focus the measuring light into the keyhole such that the intensity of the light reflected from the keyhole bottom is maximal.

According to the invention, it is thus possible to adapt the beam shaping and the alignment of the measuring light beam to the welding process, in order to obtain an optimum measuring result. Beam shaping and alignment are required because the equilibrium between surrounding melt and the vapor pressure arising in the vapor capillary, which keeps the keyhole open during the welding process, is dependent on processing parameters such as laser power, feed speed, material, etc., which is why the keyhole shape (opening, angle of inclination, depth, . . . ) is also process-dependent.

The measuring light is ideally guided via an optical waveguide to the processing head. Thermal and mechanical influences frequently have an influence on the polarization direction of the guided light in a waveguide. Negative effects thus occur in polarization-sensitive elements, for example in the diffraction grating which is necessary for the chromatic splitting of the measuring light.

It is therefore provided in one advantageous embodiment of the invention that an optically active component for changing the polarization, in particular a Faraday rotator, which rotates the polarization of the measuring light by 45°, is arranged in the collimator module between the exit/entry surface of the optical waveguide and the field lens. By using the 45° Faraday rotator at the fiber end, the polarization of the waves running back and forth is rotated so that they are always rotated by 90° in relation to one another in the fiber, independently of the external influences on the optical waveguide. Waves running back and forth may therefore be separated better from one another and it is ensured that the polarization directions of the returning light waves from the measuring and reference arms on the beam splitter are parallel to one another again, whereby the maximum possible modulation depth is achieved in the occurring interference. Furthermore, runtime differences between the s and p polarization directions are equalized.

One advantageous embodiment of the invention is distinguished in that the exit/entry surface of the optical waveguide has an angle of inclination of 8° in relation to the perpendicular to the fiber axis. In this way, the reflection at the exit/entry surface of the optical waveguide does not return back into its core, but rather can be absorbed in the jacket.

The focusing of the measuring light into the keyhole opening takes place, as a result of the coaxial arrangement, through the same lens which is also used for the focusing of the processing beam. In general, this lens is optimized for the processing wavelength, so that chromatic aberration occurs at the measuring light wavelength. Therefore, the foci of processing beam and measuring light beam are located in different planes. To nonetheless position the focus of the measuring light beam in the plane of the keyhole opening and provide a compensation of the chromatic aberration, it is provided according to the invention that for the axial setting of the focal position of the measuring light beam, the collimation lens is displaceable in the direction of its optical axis in relation to the exit/entry surface of the optical waveguide.

Alternatively, it is also possible that for the axial setting of the focal position of the measuring light beam, the exit/entry surface of the optical waveguide is displaceable together with the Faraday rotator and the field lens in relation to the collimation lens in the direction of its optical axis.

In a further embodiment of the invention, it is provided that for the lateral setting of the focal position of the measuring light beam, the exit/entry surface of the optical waveguide is displaceable with an accuracy of ≤10 μm in relation to the optical axis of the collimation lens, wherein the exit/entry surface of the optical waveguide is advantageously displaceable together with the Faraday rotator.

The size of the keyhole opening is strongly process-dependent. Thus, for example, the diameter of the keyhole opening is reduced with decreasing focus diameter of the processing beam. To nonetheless focus the measuring light completely into the keyhole opening, an adaptation of the measuring light beam to the process parameters is required. In addition to the properties of the processing beam, the object to be welded also plays a role in the keyhole geometry. Welding experiments have shown that blind welds require a smaller focus diameter of the measuring light beam than, for example, welds on butt joints.

Therefore, it is provided in one advantageous embodiment of the invention that the field lens is arranged so it is replaceable in the collimator module. An adaptation of the focus size to the process is thus possible, wherein the focal position remains unchanged.

In addition to the size, the shape of the keyhole opening and the angle of inclination are also process-dependent. Thus, with increasing feed speed, the angle of inclination of the keyhole increases, while the opening assumes an elliptical shape. To be able to adapt the measuring light beam with respect to alignment and inclination for an optimum measuring result, it is provided according to the invention that the collimator module is arranged perpendicularly to the optical axis of the processing laser beam so it is displaceable on a welding head which guides the processing laser beam.

In this case, the collimator module is advantageously held by means of an adapter part so it is displaceable on the welding head, which is preferably designed as rotating, so that the collimator module can be displaced in any arbitrary direction.

Reflections on surfaces in the beam path (lenses, beam splitter, protective glasses, . . . ), in particular on flat surfaces, generate additional interference. Because the measuring method is an interference-based method, this additional interference generates interfering signals. The reflections on the front and rear sides of a plane-parallel plate cause an interference signal, for example, which, after the analysis, supplies a signal which corresponds to the optical thickness of the plate. These interfering signals can be eliminated by a reference measurement, however, the sensitivity of the measuring system is substantially reduced in these regions. Therefore, according to the invention, a protective glass arranged in front of the focusing lens is inclined with an inclination of greater than 3° in relation to the perpendicular to the optical axis of the processing beam path, so that reflections in the optical waveguide are reduced as much as possible.

BRIEF DESCRIPTION OF THE DRAWINGS

The invention will be explained in greater detail by way of example hereafter on the basis of the drawings. In the figures:

FIG. 3 shows a schematic illustration of a welding head having an optical system for coupling in a measuring light beam for the welding penetration depth measurement;

FIG. 4 shows a schematic illustration of the optical system having adapted beam widening for large (FIG. 4a) and small (FIG. 4b) focusing focal lengths;

DETAILED DESCRIPTION OF THE PREFERRED EMBODIMENTS

Figure 1:
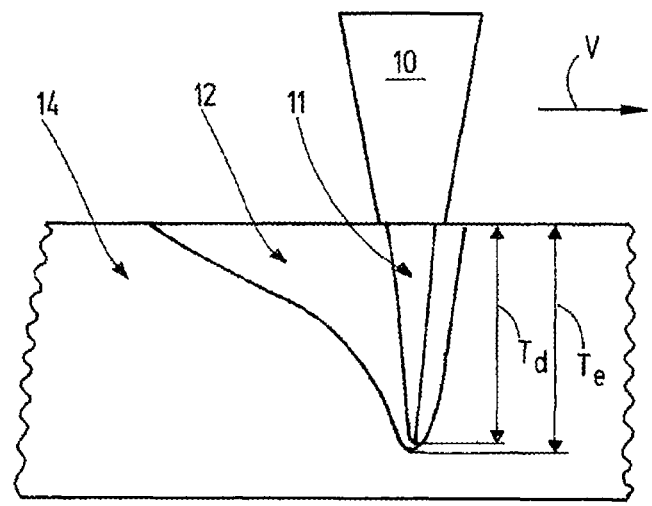
FIG. 1 shows a schematic sectional view of a workpiece to illustrate a vapor capillary (keyhole) during welding.

In the various figures of the drawing, components and elements corresponding to one another are provided with identical reference signs.

According to the invention, an optical system, referred to hereafter as a collimator module, is provided to focus measuring light from a measuring system through a welding head into a keyhole and to guide the measuring light reflected on the keyhole bottom back into the measuring system.

Figure 2:
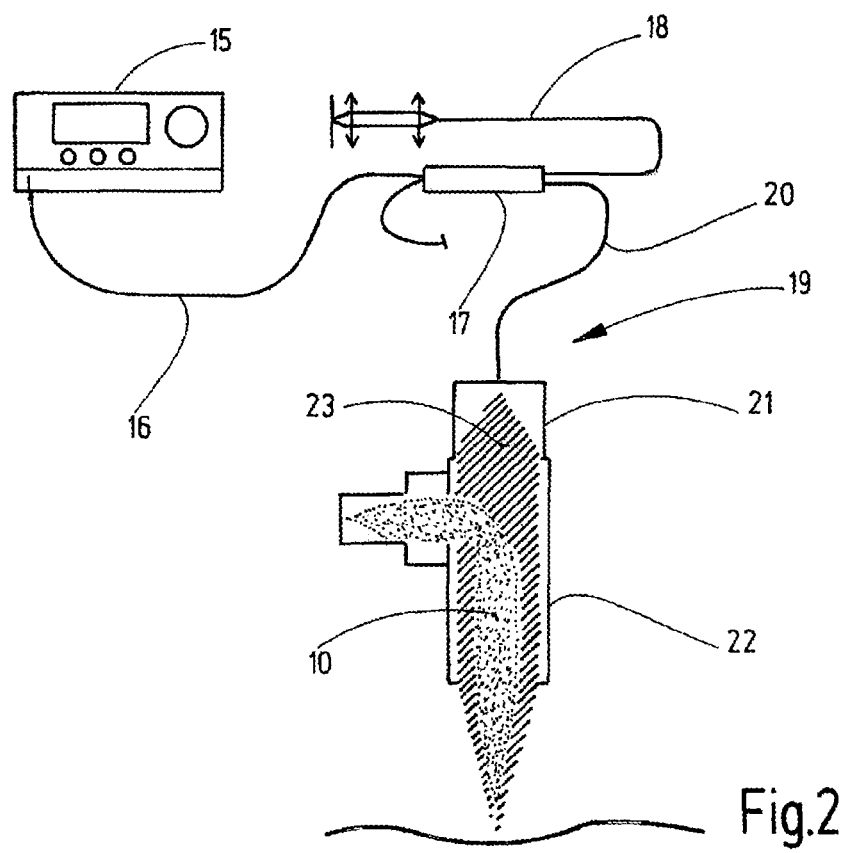
FIG. 2 shows a schematic illustration of a device according to the invention for measuring the welding penetration depth in real time.

FIG. 2 shows the complete device for determining the keyhole depth in real time. The determination or measurement of the keyhole depth Td is based on the principle of optical coherence tomography, which makes use of the coherence properties of light with the aid of an interferometer. An analysis unit 15 contains a broadband light source for this purpose (superluminescent diode, SLD), which couples the measuring light into an optical waveguide 16. In a beam splitter 17, which preferably has a fiber coupler, the measuring light is split into a reference arm 18 and a measuring arm 19, which comprises an optical waveguide 20, the collimator module 21, and the welding head 22. The collimator module 21 is used for the purpose of collimating the measuring light (measuring light beam 23) exiting from the optical waveguide 20, so that it can be coaxially superimposed in the welding head 22 with the processing beam 10. The superposition is performed, as shown in greater detail in FIG. 3, by means of a partially transmissive, in particular dichroic mirror 24, which is used as a coupling element. Subsequently, processing laser beam 10 and measuring light beam 23 are focused by a common lens 25, referred to as the focusing lens hereafter. Focal position and focus diameter of the measuring light beam are set in this case so that the measuring light is guided into the keyhole, i.e., into the vapor capillary. The measuring light reflected from the keyhole is imaged by the focusing lens 25 and the collimator module 21 on the exit/entry surface 26 of the optical waveguide 20, superimposed in the fiber coupler 17 with the reflected light from the reference arm 18, and subsequently guided back into the analysis unit 15. The superimposed light contains items of information about the path length difference between the reference arm 18 and the measuring arm 19. These items of information are analyzed in the analysis unit 15, whereby the user obtains items of information about the distance between keyhole bottom and welding head 22.

FIG. 3 shows the optical elements which are installed inside the welding head 22 and the collimator module 21. The end of the optical waveguide 20 through which the measuring light is guided to the welding head 22 has a bevel-ground fiber end as the exit/entry surface 26. The bevel grind prevents reflections from occurring at the fiber end as a result of the Fresnel reflection, which would result in additional interference. The light reflected at the beveled fiber end exceeds the limiting angle of the total reflection, which is why it is not guided in the core of the fiber but rather absorbed in the jacket material. Typically, FC/APC or E2000 APC plugs are installed at the fiber end (APC=angled physical contact), which have an angle of 8° in relation to the perpendicular to the fiber axis.

After the exit from the fiber plug, the measuring light passes through an optically active component to change the polarization, in particular a Faraday rotator 27. It rotates the polarization of the light by 45°. After the measuring light has been reflected on the keyhole bottom, it again passes through the Faraday rotator 27. In spite of the opposing propagation direction, the polarization is again rotated by 45° in the same direction, so that the polarization of the returning measuring light is rotated by 90° in relation to the polarization of the incoming measuring light. It is thus ensured that the optical total distance (out and back directions) is equal for both polarization modes and no distance difference occurs here independently of how the polarization in the optical waveguide is changed as a result of twisting. Movements of the optical waveguide 20 therefore have less influence on the measuring signal. Furthermore, it is ensured that the polarization directions of the returning light waves from the measuring and reference arms are parallel to one another again at the beam splitter, whereby the maximum possible modulation depth is achieved in the occurring interference.

After the Faraday rotator 27, a field lens 28 follows, with the aid of which the divergence of the measuring light beam 23 exiting from the optical waveguide 20 can be influenced. For example, the exiting measuring light beam 23 has a numerical aperture of 0.14 if an optical waveguide of the brand Corning SMF-28 is used. The beam widening can be varied by influencing the divergence. Therefore, on the one hand, at given focusing focal length of the focusing lens 25, the focus size of the measuring spot, i.e., the focus diameter can be changed and an optimized compromise adapted to the welding process can be found between focus size and depth of field. On the other hand, by adapting the beam widening at different focusing focal lengths, the focus size of the measuring spot can be kept constant. The changes of the lens configuration are only accompanied by minimal changes in the lens distances, because of which multiple configurations may be implemented within the housing, whereby the mechanical adaptations are restricted to a minimum.

In the case of a field lens 28 having planar-concave surface, the concave surface forms a concave mirror in the correctly installed state (curved side in the direction of the fiber plug). In spite of antireflective coating, a small part of the incident light is reflected. The concave side of the field lens would image this light on the fiber again, whereby interfering influences can result. Therefore, upon the use of planar-concave lenses, a compromise was made between imaging errors and the light which is reflected into the fiber.

The divergent measuring light beam 23 is collimated after the field lens 28 by a collimation lens 29. To reduce imaging errors, an aspherical lens is preferably used. Alternatively, lenses having two spherical surfaces can also be used, the radii of which are selected so that the spherical aberration is minimized. However, lenses can also be used which are produced from a glass having axial gradients, whereby the spherical aberration may be corrected in particular. Furthermore, doublet or triplet lenses can be used.

The collimator module 21 ends with the collimation lens 29. The collimated measuring light beam 23 is coaxially superimposed via the dichroic mirror 24 with the collimated processing laser beam 10. In the example shown in FIG. 3, the dichroic mirror ideally has a high level of reflection for the processing laser beam 10 and a high level of transmission for the measuring light beam 23. The collimation of the processing laser beam 10 takes place by way of a collimation lens 30. The processing laser light is frequently guided via an optical waveguide 31 to the welding head 22.

Processing laser beam 10 and measuring light beam 23 are focused by the common focusing lens 25 on the workpiece surface. To protect from contaminants, a protective glass 32 is generally located in front of focusing lens 25. In a protective glass 32 arranged perpendicularly to the beam path, a reflection generally occurs on the front and rear sides. These two reflections interfere with one another and are imaged on the fiber end and therefore analyzed in the analysis unit, whereby a distance signal results, which corresponds precisely to the optical thickness of the protective glass 32. The typical thickness of a protective glass is 1.5 to 2 mm. Therefore, a distance signal results which is in the range in which typical welding penetration depths are measured. To minimize this interfering signal, the protective glass 32 is preferably installed with an incline. The reflections are thus no longer completely imaged on the fiber end and the interfering signal is significantly reduced. The angle of inclination of a protective glass is preferably at values >3° in relation to the perpendicular to the optical axis of the processing beam path.

Typical focus diameters of the processing beam in laser deep welding vary between approximately 200-600 µm. The keyhole opening generally has a smaller diameter, which is why the measuring light has to be focused onto a diameter which is smaller than the processing beam. At the same time, welding penetration depths of several millimeters are implemented in many applications, whereby a large aspect ratio results between keyhole depth and its diameter. It is therefore necessary to focus the measuring light optimally into the keyhole opening, so that as much light as possible is reflected back from the keyhole bottom and is available for analysis.

To be able to adjust the focus of the measuring light beam 23 in three dimensions onto the keyhole opening for this purpose, optical elements have to be mounted so they are movable in the region of the collimation, i.e., in the collimator module. In welding processes, relatively large focusing focal lengths in the range of 150 to 1000 mm are generally used. For an optimum compromise between focus diameter and depth of field of the measuring light beam, collimation focal lengths between 50 to 100 mm are required. Movements of optical elements in the region of the collimation are significantly amplified in the image plane by the imaging ratio between collimation focal length and focusing focal length. A corresponding fine-mechanical setting capability is therefore necessary. If a focusing focal length of f=300 mm and a collimation focal length of f=50 mm are used, an imaging ratio of 1:6 results. If one wishes to position the measuring spot, i.e., the focus of the measuring light beam 23, in the image plane precisely at 50 µm, thus, for example, the fiber end, i.e., the exit/entry surface 26 of the waveguide 20 in the object plane, has to be positioned precisely at 8 µm.

FIG. 4a shows the setting options which are provided on the collimator module 21, so that the focus of the measuring light beam 23, i.e., the measuring spot, can be adjusted optimally in the keyhole opening in three spatial directions. The axial setting of the focus is performed by axial displacement of the collimation lens 29. In this way, the collimated beam becomes somewhat divergent or convergent, whereby the location of the focus is axially displaced. Alternatively to the displacement of the collimation lens 29, the unit consisting of fiber end, Faraday rotator 27, and field lens 28 can also be displaced. The lateral adjustment of the focus is performed by lateral displacement of the fiber plug, i.e., the end of the optical waveguide 20 in relation to the optical axis of the collimation lens 29.

It has been shown by simulations that no significant imaging errors yet occur due to the off-axis arrangement of the fiber end, i.e., by the arrangement of the fiber end offset in relation to the optical axis, at the required displacement paths of 1 to 2 mm. Because of the limited aperture of the Faraday rotator 27 used, it is also laterally displaced with the fiber plug. Due to the imaging ratio between collimation and focusing, i.e., due to the focal length ratio of collimation lens 29 and focusing lens 25, the adjustment movement is significantly amplified in the region of the focus. In the case of the lateral displacement, the amplification in a typical welding head configuration (collimation focal length $f_{col}$=50 mm and focusing focal length $f_{foc}$=300 mm) is a factor of 6. To nonetheless focus the measuring light precisely into the keyhole opening, a resolution of the adjustment unit of ≤10 µm is required.

Depending on the process parameters, the keyhole opening has a diameter in the range of several hundred micrometers. The depth can extend over multiple millimeters, however. As a result of this large aspect ratio, absorption and scattering occurs on the walls of the keyhole, so that only a small fraction of the incident light is reflected on the keyhole bottom, leaves the keyhole again, and is collected by the processing optical unit. For this reason, the available measuring light has to be focused as completely as possible into the keyhole, so that significant losses do not already occur during the coupling in. Furthermore, it is advantageous to keep the number of reflections on the keyhole side wall minimal, to minimize absorption and scattering. This can be achieved by a large depth of field of the focused measuring light, which is set by a corresponding beam widening. Because a small focus diameter also results in a small depth of field, a compromise has to be found between the two variables.

FIG. 4b shows an example of how the beam widening can be changed by replacing the field lens 28 at given collimation focal length. At constant focusing focal length, a greater depth of field and a larger focus diameter result due to the smaller beam diameter.

Figure 5:
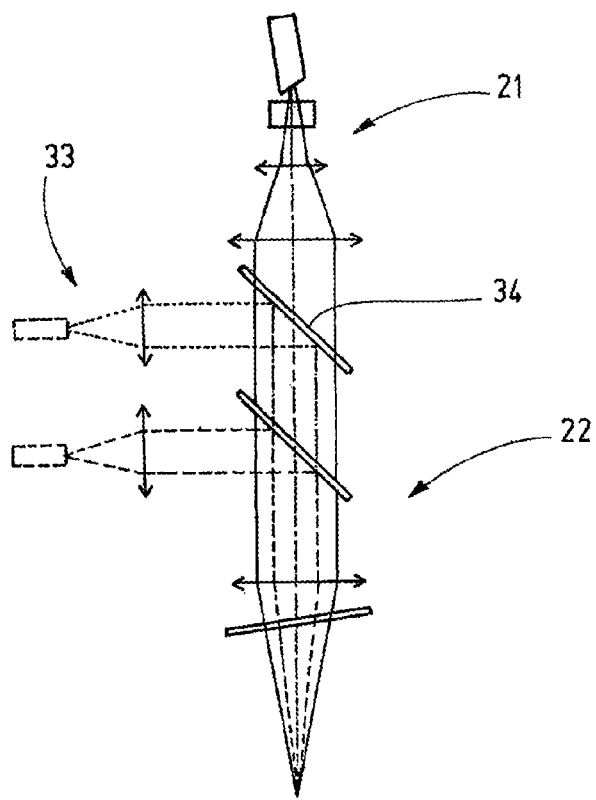
FIG. 5 shows a schematic illustration of a welding head similar to that according to FIG. 3 having additional coaxial process monitoring using camera or photodiodes.

In many applications of laser welding, a coaxial camera-based or photodiode-based system 33 is used for the process observation. In combination with the coaxial welding penetration depth measurement, as shown in FIG. 5, an additional dichroic mirror 34 can be used to separate the measuring light from the collimator module 21 from the remaining process observation.

Figure 6:
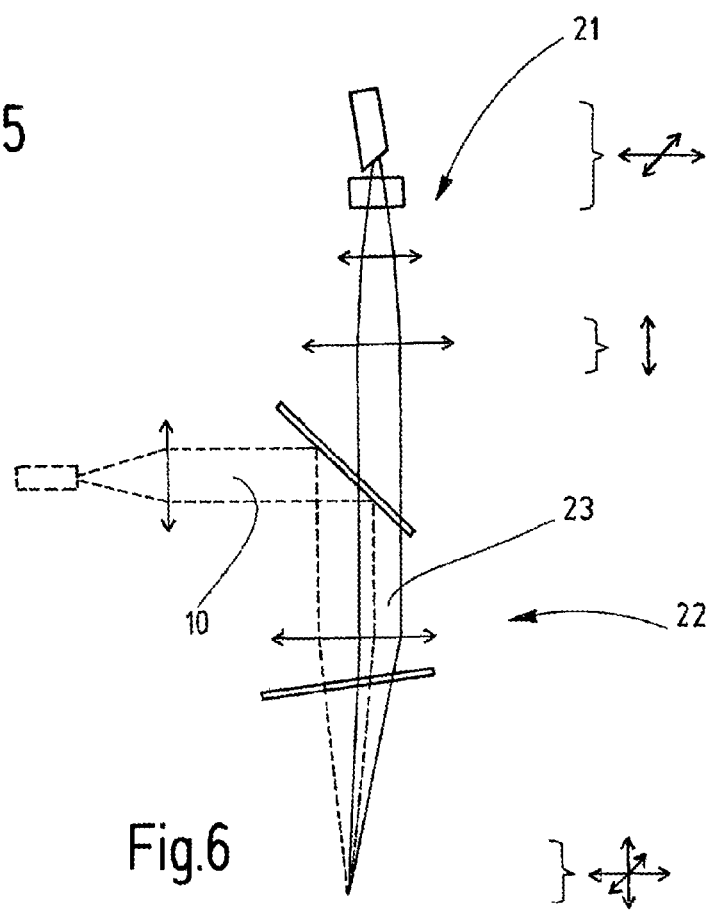
FIG. 6 shows a schematic illustration of a welding head similar to that according to FIG. 3 with a laterally displaceable optical system.

In processes having high feed speed, the inclination of the keyhole 11 changes. For better coupling in of the measuring light beam 23, it can therefore be advantageous to also incline the optical axis of the measuring light beam 23, which is defined by the optical axis of the collimation lens 29, wherein the processing laser beam 10 remains unchanged. FIG. 6 shows an example of a possibility for causing the measuring light beam 23 striking the keyhole 11 to be incident diagonally. For this purpose, the entire collimator module 21 is displaced perpendicularly to the optical axis of the processing laser beam 10. With increasing displacement, the inclination increases, whereby an adaptation to the feed speed and therefore to the keyhole inclination is possible.

The advantage of this method is that the settings at the collimator module 21 and at the welding head 22 themselves remain unchanged. The displacement can be performed by an adapter part (not shown in greater detail) between collimator module 21 and welding head 22, so that cost-effective retrofitting is possible. The adapter part can furthermore be designed as rotating, so that the collimator module 21 can be displaced in any arbitrary direction. A direction-independent welding process can thus be carried out.

Figure 7:
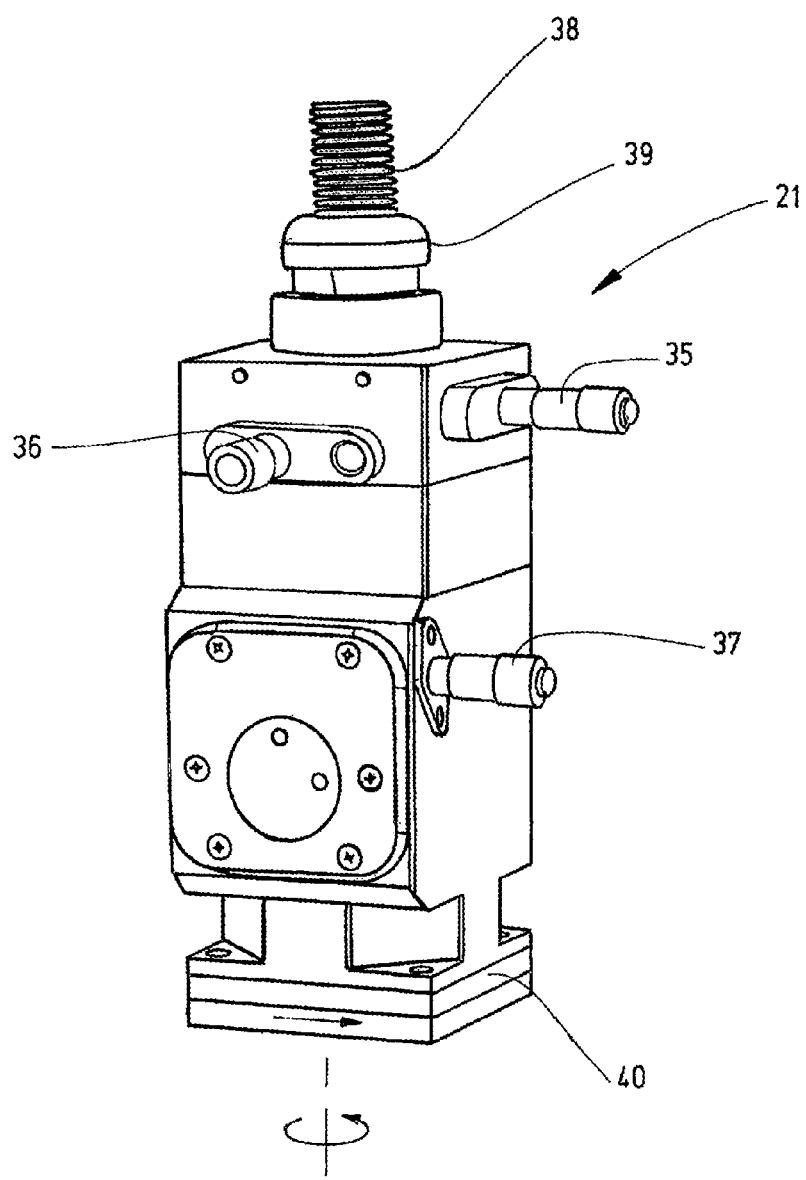
FIG. 7 shows a perspective illustration of the optical system arranged in a housing.

During the operation of a welding head 22, contaminants such as welding spray and dust arise. Therefore, the optical units and the fine-mechanical adjustment options in the collimator module 21 have to be protected from external influences in the industrial environment. Therefore, in spite of the fine-mechanical adjustment options, a robust, dust-tight construction is necessary. A housing is required for this purpose which offers the corresponding protection and nonetheless offers a high-precision setting option in a small installation space. For this purpose, a housing was designed (FIG. 7), which does not have any external moving parts except for setting screws 35, 36, and 37. In a way not shown in greater detail, the fiber plug moves inside a metal-PVC tube 38, whereby no additional friction forces occur. Removal of the optical waveguide 20 at the customer is nonetheless provided by loosening a union nut 39.

Because the keyhole 11 only occurs during the welding process, an exact adjustment of the measuring light beam in the keyhole 11 can only take place during the welding procedure. Because a plurality of processing parameters have influence on the keyhole (feed speed, material, welding geometry, laser power, . . . ), the measuring spot position has to be ascertained individually for each welding process. Multiple variants are possible for the adjustment.

1. A manual iterative alignment of the measuring spot on the keyhole 11 by rotating the setting screws 35, 36, and 37.

2. An iterative adjustment in which the setting screws 35, 36, and 37 are driven by motors.

3. A motorized adjustment combined with a search algorithm to automatically search for the keyhole position during a welding process.

Welding heads 21 can be expanded by the collimator module 21 so that a measuring light beam can be focused optimally into the occurring keyhole opening. In this way, it is possible to define the keyhole depth and therefore the welding penetration depth in real time by the measuring principle of optical coherence tomography.

By way of the adjustment option of the collimator module, the focus of the measuring light beam may also be adjusted leading or trailing in relation to the processing beam. In the case of leading, the distance to the upper plate can therefore be measured and the axial focal position of the processing beam can be adapted. This is advantageous in particular in the laser cutting of nonmetallic materials, because a capacitive distance measurement is not possible here. In the case of trailing, the seam upper bead can be measured during the laser welding, whereby inferences can be drawn about possible processing errors.

It is possible by way of a motorized adjustment to carry out distance measurements before, during, and after the process, in that the measuring light beam periodically acquires the different positions. Therefore, distance to the upper plate, welding penetration depth, and quality of the seam can be acquired using a measuring system. In addition to the adjustment options driven by motors, distance measurements at multiple points can also be implemented by a system of scanner mirrors, which are arranged between field lens 28 and collimation lens 29 and deflect the measuring light beam. Multiple fiber ends located adjacent to one another, which can be addressed individually via a fiber selector switch, suggest themselves as a further alternative.

Distance signals can also be acquired from multiple positions with a static measuring light beam by suitable beam shaping within the collimator module. For example, if a wedge plate is partially integrated into the beam path, the measuring light beam thus splits into two partial beams which each supply an independent distance signal. It is therefore possible to acquire the distance to the workpiece surface and the keyhole depth simultaneously.

The invention claimed is:

1. A device for measuring the depth of a weld seam in real time during the welding or joining of a workpiece by means of radiation, comprising: its measuring light source, the light of which is coupled by a beam splitter into a reference arm and a measuring arm;
   an optical waveguide in the measuring arm;
   a collimator module having at least one collimation lens for collimating a measuring light beam, which is fed to the collimator module via the optical waveguide in the measuring attn, and for imaging the measuring light beam, which is reflected from a workpiece to be processed, on an exit/entry surface of the optical waveguide;
   a coupling element for coupling the measuring light beam into the beam path of a processing beam;
   a focusing lens for the joint focusing of the measuring light beam and the processing beam on the workpiece and for the collimating of the reflected measuring light beam; and
   an analysis unit for determining the depth of a weld seam, into which the measuring light reflected from the workpiece is guided with a superimposed, reflected light from the reference arm;
   wherein the collimator module comprises means for setting the axial focal position of the measuring light beam, means for setting the lateral focal position of the measuring light beam, and a field lens, which is arranged between the exit/entry surface of the optical waveguide and the collimation lens and defines the beam widening of the measuring light beam and therefore the focus diameter of the measuring light beam,
   wherein the exit/entry surface of the optical waveguide has an angle of inclination in relation to the perpendicular to a fiber axis, and
   wherein the exit/entry surface of the optical waveguide is displaceable with an accuracy of ≤10 μm in relation to the optical axis of the collimating lens for the lateral setting of the focal position of the measuring light beam.

2. The device as claimed in claim 1, wherein an optically active component for changing the polarization, in particular a Faraday rotator, which rotates the polarization of the measuring light by 45°, is arranged in the collimator module between the exit/entry surface of the optical waveguide and the field lens.

3. The device as claimed in claim 1, wherein the angle of inclination of the exit/entry surface of the optical waveguide is 8° in relation to the perpendicular to the fiber axis.

4. The device as claimed in claim 1, wherein the collimation lens is displaceable in the direction of its optical axis in relation to the exit/entry surface of the optical waveguide for the axial setting of the focal position of the measuring light beam.

5. The device as claimed in claim 2, wherein the exit/entry surface of the optical waveguide is displaceable together with the Faraday rotator and the field lens in relation to the collimation lens in the direction of its optical axis for the axial setting of the focal position of the measuring light beam.

6. The device as claimed in claim 2, wherein the exit/entry surface of the optical waveguide is displaceable together with the Faraday rotator.

7. The device as claimed in claim 1, wherein the field lens is arranged so it is replaceable in the collimator module.

8. The device as claimed in claim 1, wherein the collimator module is arranged so it is displaceable perpendicularly to the optical axis of the processing laser beam on a welding head which guides the processing laser beam.

9. The device as claimed in claim 8, wherein the collimator module is held so it is displaceable on the welding head by means of an adapter part.

10. The device as claimed in claim 9, wherein the adapter part is designed as rotating, so that the collimator module can be displaced in any arbitrary direction.

11. The device as claimed in claim 1, wherein a protective glass is arranged in front of the focusing lens, which is inclined with an inclination of greater than 3° in relation to the perpendicular to the optical axis of the processing beam path.

* * * * *